(12) United States Patent
Feng et al.

(10) Patent No.: US 12,075,737 B2
(45) Date of Patent: Sep. 3, 2024

(54) MODULAR DESIGN FOR HORTICULTURAL LUMINAIRES

(71) Applicant: ABL IP HOLDING LLC, Atlanta, GA (US)

(72) Inventors: Yongli Feng, ShaanXi (CN); Honglei Gao, ShangHai (CN); Robert Spivock, Lachine (CA); Michel Doss, Lachine (CA)

(73) Assignee: ABL IP Holding LLC, Atlanta, GA (US)

( * ) Notice: Subject to any disclaimer, the term of this patent is extended or adjusted under 35 U.S.C. 154(b) by 87 days.

(21) Appl. No.: 17/453,946

(22) PCT Filed: May 7, 2020

(86) PCT No.: PCT/US2020/031805
§ 371 (c)(1),
(2) Date: Nov. 8, 2021

(87) PCT Pub. No.: WO2020/227487
PCT Pub. Date: Nov. 12, 2020

(65) Prior Publication Data
US 2023/0240205 A1    Aug. 3, 2023

Related U.S. Application Data

(60) Provisional application No. 62/844,469, filed on May 7, 2019.

(51) Int. Cl.
*A01G 9/24* (2006.01)
*F21S 8/06* (2006.01)
(Continued)

(52) U.S. Cl.
CPC .............. *A01G 9/249* (2019.05); *F21S 8/065* (2013.01); *F21V 21/14* (2013.01); *F21Y 2115/10* (2016.08)

(58) Field of Classification Search
CPC .............. A01G 9/249; F21S 8/06; F21V 21/14
See application file for complete search history.

(56) References Cited

U.S. PATENT DOCUMENTS

2018/0010776 A1*   1/2018   Shim ........................ F21K 9/232

FOREIGN PATENT DOCUMENTS

| KR | 20110008826 A | 1/2011 |
|---|---|---|
| KR | 20110113698 A | 10/2011 |

(Continued)

OTHER PUBLICATIONS

International Search Report and Written Opinion dated Aug. 26, 2020 which was issued in a counterpart application PCT/US2020/31805.

*Primary Examiner* — Joseph L Williams
(74) *Attorney, Agent, or Firm* — Kilpatrick Townsend & Stockton LLP

(57) ABSTRACT

Embodiments are directed to a horticultural luminaire and method for assembling the horticultural luminaire. The horticultural luminaire may include a center body having a top surface and a bottom surface and comprising three or more items of material. A driver may be coupled to each of the items of material. The horticultural luminaire may also include a plurality of arms onto which lighting units are mounted. For each arm of the plurality of arms, a first end of the arm may be detachably coupled to a corresponding item of the three or more items of material. A corresponding driver may provide electrical power to light the lighting units on each arm.

20 Claims, 9 Drawing Sheets

(51) Int. Cl.
*F21V 21/14* (2006.01)
*F21Y 115/10* (2016.01)

(56) References Cited

FOREIGN PATENT DOCUMENTS

| | | | |
|---|---|---|---|
| KR | 101274014 | B1 | 6/2013 |
| KR | 101560142 | B1 | 10/2015 |
| KR | 101667525 | B1 | 10/2016 |

* cited by examiner

MODULAR DESIGN FOR HORTICULTURAL LUMINAIRES

CROSS-REFERENCE TO RELATED APPLICATIONS

The present application claims the benefit of U.S. Provisional Patent Application No. 62/844,469 entitled "MODULAR DESIGN FOR HORTICULTURAL LUMINAIRES" and filed on May 7, 2019, and PCT Application No. PCT/US2020/31805 entitled "MODULAR DESIGN FOR HORTICULTURAL LUMINAIRES" which was filed on May 7, 2020. The entire content of that application is incorporated herein by reference.

BACKGROUND

A horticultural luminaire may convert electrical energy into usable light for plant growth within a controlled environment plant growth facility, such as a greenhouse. A horticultural luminaire may comprise a grow light, e.g., an artificial light source designed to stimulate plant growth by emitting a light appropriate for photosynthesis. A horticultural luminaire may be used in applications where there is either no naturally occurring light, or where supplemental light is required or is otherwise beneficial. For example, in the winter months when the available hours of daylight may be insufficient for the desired plant growth, light emitted by horticultural luminaires may be used to extend the time that plants receive light. In some urban environments, such as densely populated cities where outdoor farmland is either not readily available or is otherwise prohibitively expensive, it may be more economical to grow certain plants within greenhouses instead of growing them outside of the cities and then shipping them to the cities for consumption. Moreover, the need for certain types of insect repellents, such as pesticides, may be reduced or otherwise effectively eliminated if the plants are grown within a greenhouse.

For example, horticultural luminaires may be utilized within a greenhouse to extend the growing seasons for various plants. Plants primarily use wavelengths of light within the visible range of 400-700 nm to drive photosynthesis. Such light may be provided by lighting units or elements of a horticultural luminaire.

High-power LEDs may provide benefits in life-science applications such as horticulture. For example, solid-state lighting (SSL) sources such as LED grow lights may offer energy efficiency, low/no maintenance, spectral control, and beam control, for example. LED grow lights may comprise light-emitting diodes. LED grow lights do not usually require a separate ballast and can be plugged directly into a standard electrical socket.

LED grow lights and other types of lights may produce little or no heat. However, such LED grow lights are typically coupled to drivers or other power-related components, such as alternating current (AC)/direct current (DC) transformers which do generate a certain amount of heat. Such heat may result in damage to an LED grow light and/or a plant itself placed within a certain distance from the drivers or other power-related components. Accordingly, if the drivers or other power-related components are placed relatively close to a plant, heat from the LED grow lights may damage the LED grow lights, resulting in degraded performance and/or may damage the plant or may otherwise impede growth of the plant.

SUMMARY

According to an aspect of an example embodiment, a horticultural luminaire may include a center body having a top surface and a bottom surface and comprising three or more items of material. A driver may be coupled to each of the items of material. The horticultural luminaire may also include a plurality of arms onto which lighting units are mounted. For each arm of the plurality of arms, a first end of the arm may be detachably coupled to a corresponding item of the three or more items of material. A corresponding driver may provide electrical power to light the lighting units on each arm.

According to an aspect of another example embodiment, a method of assembling a horticultural luminaire is provided. A main body assembly having an approximate top and an approximate bottom may be hanged. The main body assembly may have a user-configurable number of sides. Each side of the main body assembly may comprise at least one item of material extending in a planar direction between the approximate top and the approximate bottom of the main body assembly. Arms may be attached to the user-configurable number of sides of the main body assembly. Lighting units may be mounted onto the arms. Each one of the arms may be attached to each of the user-configurable number of sides of the main body. A first end of each one of the arms may be detachably coupled to a corresponding side of the user-configurable number of sides. A corresponding driver may provide electrical power to light the lighting units on each one of the arms.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
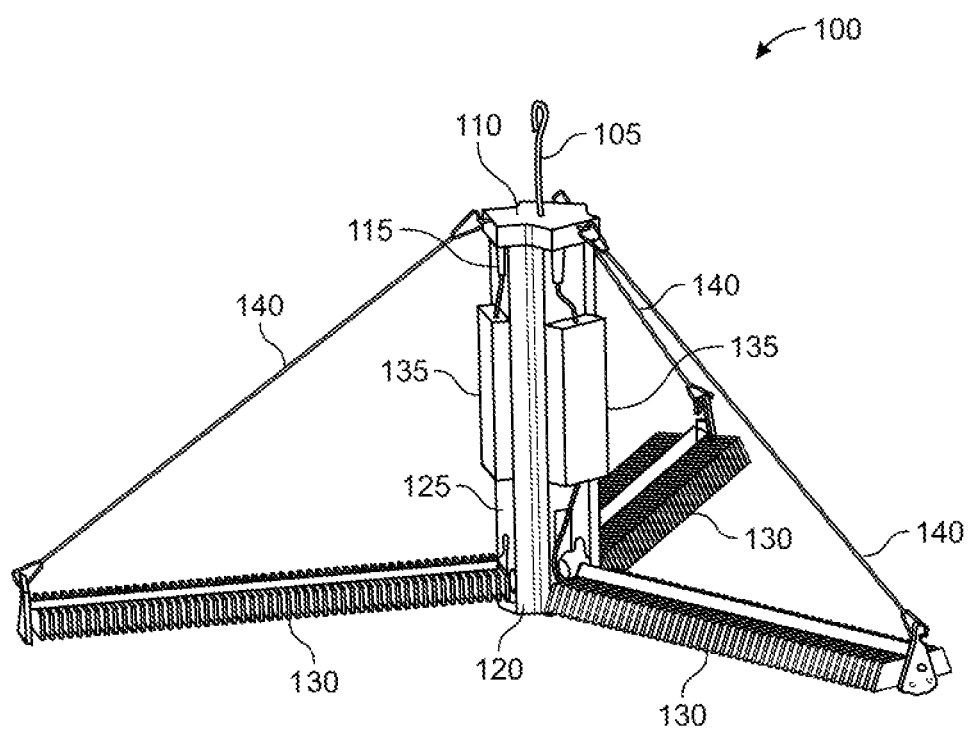
FIG. 1 illustrates an embodiment of a horticultural luminaire.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

One or more embodiments, as discussed herein, generally relate to a modular design for a horticultural luminaire. For example, an embodiment of a horticultural luminaire may comprise a hollow main body to which various arms may be attached, and where lighting units or elements, such as Light Emitting Diodes (LEDs), may be attached to the arms. In accordance with an embodiment, one or more drivers or AC/DC transformers, for example, may be attached, coupled, or otherwise mounted onto an external surface of a hollow main body disposed a sufficient distance from LEDs disposed on the arms so that heat generated by the drivers and/or AC/DC transformers does not damage the LEDs. The arms of such an embodiment may be folded and/or retracted in order to reduce an amount of natural light blocked by the arms at certain times of the day, for example. Various additional features of embodiments are discussed herein such as with reference to one or more drawings below.

A horticultural luminaire may convert electrical energy into usable light for plant growth within a controlled environment plant growth facility, such as a greenhouse. A horticultural luminaire may comprise a grow light, e.g., an artificial light source designed to stimulate plant growth by emitting a light appropriate for photosynthesis. For example, horticultural luminaires may be utilized within a greenhouse to extend the growing seasons for various plants. Plants primarily use wavelengths of light within the visible range of 400-700 nm to drive photosynthesis. Such light may be provided by lighting units or elements of a horticultural luminaire.

Solid-state lighting (SSL) sources, such as high-power LEDs, for example, may provide benefits in life-science applications such as horticulture. As discussed above, SSL sources such as LED grow lights may offer energy efficiency, low/no maintenance, spectral control, and beam control, for example. LED grow lights may comprise light-emitting diodes. LED grow lights do not usually require a separate ballast and can be plugged directly into a standard electrical socket.

A use case for LEDs in fruit and vegetable farming may center around extending the growing season, especially in cold regions with short summers. One particular advantage of an SSL source such as an LED is due to a feature whereby lighting from such an SSL source may produce little or no heat and growers may use interlighting, e.g., placing lights near/between the plants, positioned either vertically or horizontally, so as to deliver light to the lower foliage that does not receive much direct light from above as the plant grows.

A greenhouse use case for LEDs may be as a supplementary light source to the sun, although artificial lighting may be increasingly vital during the colder and shorter days of winter. LEDs may have a particularly large impact, e.g., in growing leafy greens and herbs that only reach heights measured in inches and that can be grown in layers or racks with each layer having a dedicated set of LED luminaires relatively close to the plants, again enabled by little to no heat radiated by the LEDs. Such a layering may enable so-called urban or vertical farms to occupy relatively small growing spaces inside buildings near population centers, while optimal lighting and technology including hydroponics may enable much faster plant/harvest cycles than may be capable of being achieved outdoors.

In accordance with an embodiment, as discussed herein, a horticultural luminaire is provided which has a modular design, and may include numerous lighting units or elements, such as LEDs, where drivers or other power-related components are disposed sufficiently far from the LEDs so that heat generated by the drivers or power-related components does not damage or otherwise degrade performance of the LEDs and/or a plant which is provided light, such as for photosynthesis. A horticultural luminaire in accordance with such an embodiment may have a shape which reduces an amount of natural sunlight blocked by the horticultural luminaire, such as within a greenhouse, for example. A horticultural luminaire may also include a relatively hollow main body which may assist in dissipating heat generated by the drivers or other heat-related components, for example. A horticultural luminaire may comprise a modular design where a driver is coupled to a side of a sheet of material, for example. Embodiments are discussed below which include one or more sheets of material. However, it should be appreciated that in some embodiments, items or objects of material other than, or in addition to, one or more sheets of material may be utilized. For example, in certain embodiments, an item of material such as a unibody material comprising three or more faces may be utilized.

In accordance with one or more embodiments, a sheet of material forming at least a portion of a body of a horticultural luminaire may comprise a metal and/or plastic material, for example. Three or more sheets of material may be coupled together to form a center body of a horticultural luminaire. An arm may be attached at a particular location of a sheet of material forming the center body, such as at or near a bottom end of the sheet. Various lighting elements, such as LEDs or other types of SSL sources, may be coupled to an arm and electrical power may be supplied to light the lighting elements by a driver mounted to a sheet of material onto which the arm is coupled. A horticultural luminaire may include one arm coupled to each sheet of material forming the center body in accordance with a particular embodiment. Accordingly, if the horticultural luminaire is formed by three sheets of material, the horticultural luminaire may therefore include three arms. Similarly, if the horticultural luminaire is formed by four or five sheets of material, the horticultural luminaire may therefore include four or five arms, respectively, for example.

In accordance with an embodiment, direct sunlight may provide about 80% of the light for photosynthesis of a plant, whereas horticultural luminaires may provide the remaining 20% of the light for the photosynthesis. However, it should be appreciated that the percentage of light provided by horticultural luminaires may vary based on application, geographical location, and time of year, for example. During winter months when there is less daylight, horticultural luminaires may provide a larger percentage of light for photosynthesis than the horticultural luminaires provide during summer months when there is relatively more sunlight, for example.

FIG. 1 illustrates an embodiment 100 of a horticultural luminaire. As shown, embodiment 100 includes a pothook 105 which may be utilized to couple the horticultural luminaire to a ceiling or support beam, for example. Pothook 105 may be attached to a back cover 110. Back cover 110 may include a connector, for example. For example, such a connector may connect to a power grid, such as a 120V AC power source or 220V AC power source, to power various lighting units, such as light emitting diodes (LEDs), as discussed further below. In some other embodiments, back cover may receive power from some source other than a power grid, such as a solar panel and/or battery, for example. A center body 115 or extrusion body may extend in a direction parallel to the pothook 105, for example. Back cover 110 may be coupled to a top end of center body 115 and a front cover 120 may be coupled to a bottom end of center body 115. Center body 115 may be formed of various sheets 125 of material. For example, center body 115 may include several sides extending along a vertical length, where a sheet 125 of material, such as an extrusion part, forms a side. In accordance with an embodiment, three or more sheets 125 of material may form sides comprising center body 115. Sheets 125 forming center body 115 may be held in place by back cover 110 and bottom cover 120. An arm 130 may be coupled to a sheet 125 at an end near front cover 120. In one particular embodiment, one arm 130 may be coupled to each sheet 125. In embodiment 100, center body 115 includes three sheets 125 and three arms 130. It should be appreciated that in some embodiments, more than three sheets 125 and arms 130 may be utilized, such as four or five sheets 125 and arms 130, for example. In some other embodiments, two sheets 125 and two corresponding arms 130 may be utilized, for example. Arm 130 may comprise a module with an end cap, for example. Various lighting elements, such as LEDs or some other type of SSL source may be coupled to or otherwise mounted onto arm 130. For example, LEDs on an arm 130 may be powered by electric power from a driver 135 mounted on a corresponding sheet 125. A "driver," as used herein, refers to electrical components or circuitry which are capable of providing electrical power. In one implementation, a driver 135 may comprise an AC/DC transformer, e.g., to receive AC power, such as from an electric outlet and convert the AC power into DC power to light one or more LEDs mounted on arm 130. A driver 135 may produce heat during operation which may harmful to LEDs and/or to plants receiving light from the LEDs. By locating a driver on a side of a sheet 125, the driver 135 may be positioned far enough away from LEDs on arm 130, e.g., so that the LEDs are not damaged by heat from the driver 130. Moreover, by placing the driver 135 on and exterior surface of the center body 115, instead of on an interior surface of the center body 115, air flow within a greenhouse, for example, may cool the driver 135, thereby dissipating some of the heat given off by the driver 135. A shape of the center body 115 itself may additionally server to dissipate some of the heat produced by the driver. For example, an interior portion of the center body 115 may be hollow. Accordingly, air flow within the interior portion of center body 115 may dissipate some of the heat given off by the driver 135.

Each arm 130 may be coupled to the center body 115, as shown in FIG. 1. For example, each arm 130 may include teeth which may lock the arm 130 into place on the center body 115. In some implementations, an arm 130 may be coupled to the center body 115 via use of an interlock structure such as where a member of an arm 130 may be secured within a receiving portion of center body 115, such as discussed below with respect to FIG. 7, for example. In some implementations, a hinge may be secured to both arm 130 and center body 115 to secure the arm 130 to center body 115, for example. An opposing end of each arm 130 may be coupled to a wire 140, such as a steel wire, to additionally secure the arm to the horticultural luminaire. In an embodiment as shown in FIG. 1, the wires 140 are stationary and serve to support some of the weight of the arms 130. In other embodiments, for example, a wire 140 may be attached to a motor coupled at or near a top portion of the center body 115 so that the arms 130 can be raised from a position where the arms 130 are approximately perpendicular to the center body 115 to a position where the arms are approximately parallel to the center body 115. For example, a motor may rotate, withdrawing the wire 140 into the motor as it rotates in order to raise the arms 130. Alternatively, if the arms 130 are to be lowered, the motor may rotate in an opposing direction, e.g., to permit a portion of the wire 140 within the motor to be expelled in order to the lower the arms from a position where the arms 130 are approximately parallel to the center body 115 to a position where the arms 130 are approximately perpendicular to the center body 115, for example. In a particular implementation, arms 130 may be folded up from a position perpendicular to the center body 115 to a position parallel to the center body 115 manually, such as by a human operator, for example.

In an embodiment in accordance with FIG. 1, each arm 130 may hold LEDs capable of receiving 200 watts of electric power to generate light, for example. Dimensions of a horticultural luminaire in accordance with embodiment 100 may vary. However, in one particular embodiment, main body 115 may be approximately 24 inches in height and each arm may be approximately 24 inches in length, for example.

A horticulture luminaire in accordance with embodiment 100 may be utilized with an interlight implementation. For example, an arm 130 of embodiment 100 may be positioned relatively close to a plant being grown. In one particular example, if the plant being grown is a vine crop, a portion of the vine may be disposed in contact with the arm 130, for example. For example, a portion of a vine crop may be placed on top of, or at least partially wrapped around, a portion of arm 130.

Figure 2A:
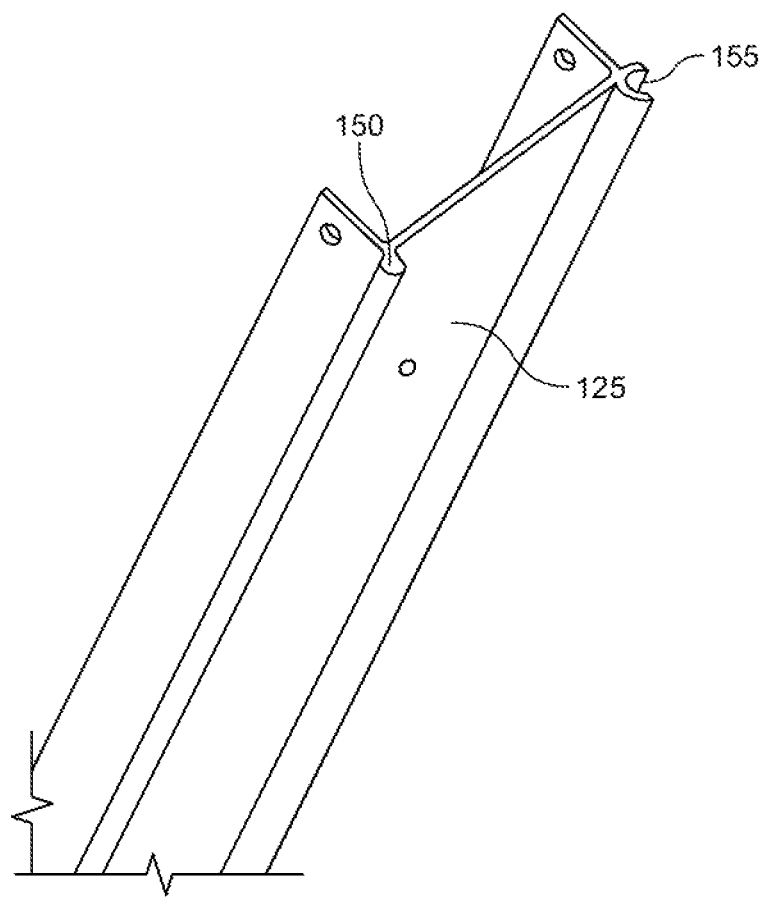
FIG. 2A is a perspective view of a sheet of material of a center body of a horticultural luminaire according to an embodiment.
Figure 2B:
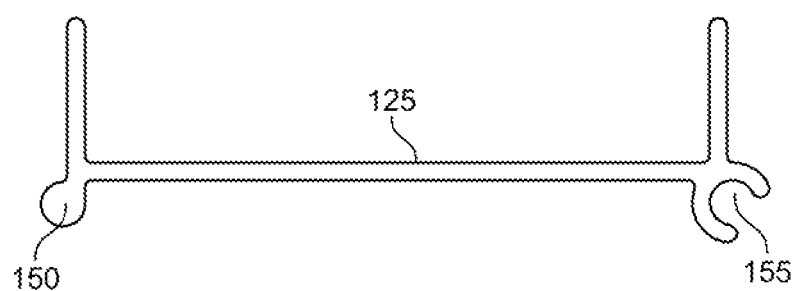
FIG. 2B is a cross-sectional view of a sheet of material of a center body of a horticultural luminaire according to an embodiment.

FIGS. 2A and 2B illustrate a sheet 125 of a material to form a side of center body 115 according to an embodiment. FIG. 2A is a perspective view of sheet 125 and FIG. 2B is a cross-sectional view of sheet 125. As discussed above, sheet 125 may be formed of various materials, such as aluminum or some other type of metal and/or plastic, for example. As discussed above, three or more sheets 125 may be coupled or connected in order to form center body 115, for example, in accordance with various embodiments. As shown in FIGS. 2A and 2B, a sheet 125 may include a male portion 150 and a female portion 155 disposed on opposite sides. One sheet 125 may be coupled to another sheet 125 by inserting the male portion 150 of a sheet 125 into a female portion 155 of another sheet 125. In one implementation, a male portion 150 of a sheet 125 may be slid into a female portion 155 of another sheet 125. In other implementations, a male portion 150 of a sheet 125 may be snapped into a female portion 155 of another sheet 125. After three or more sheets 125 may been coupled in this way, front cover 120 and back cover 110 may be installed as shown in FIG. 1 to lock the sheets 125 into position, for example.

Figure 3A:
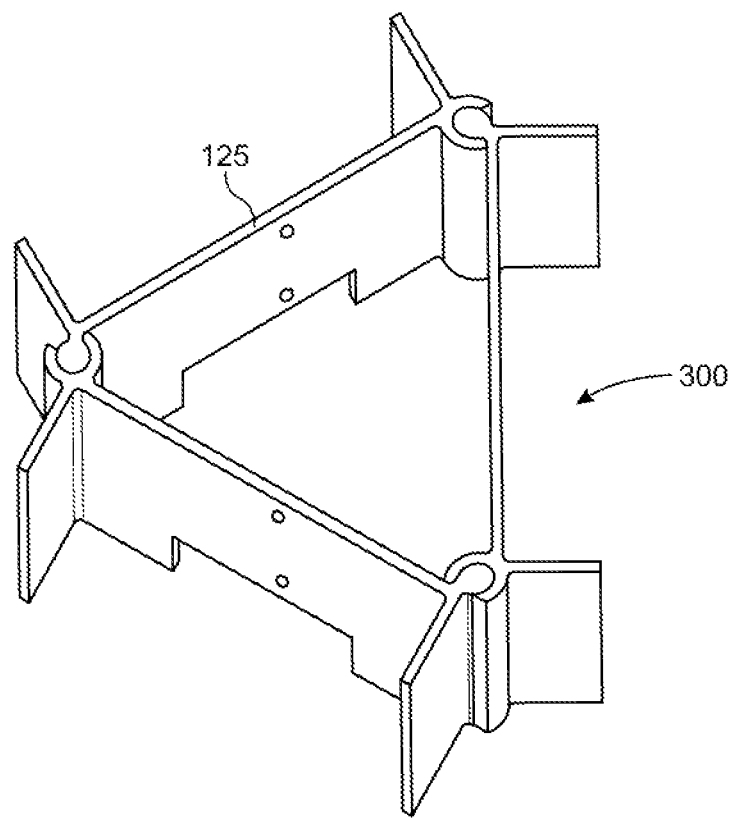
FIG. 3A illustrates a 3-sided embodiment of a center body of a horticultural luminaire.
Figure 3B:
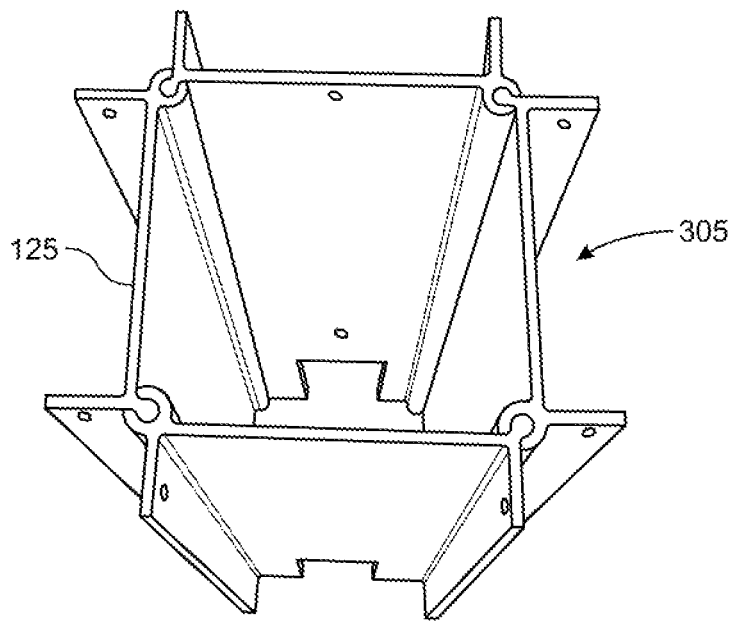
FIG. 3B illustrates a 4-sided embodiment of a center body of a horticultural luminaire.
Figure 3C:
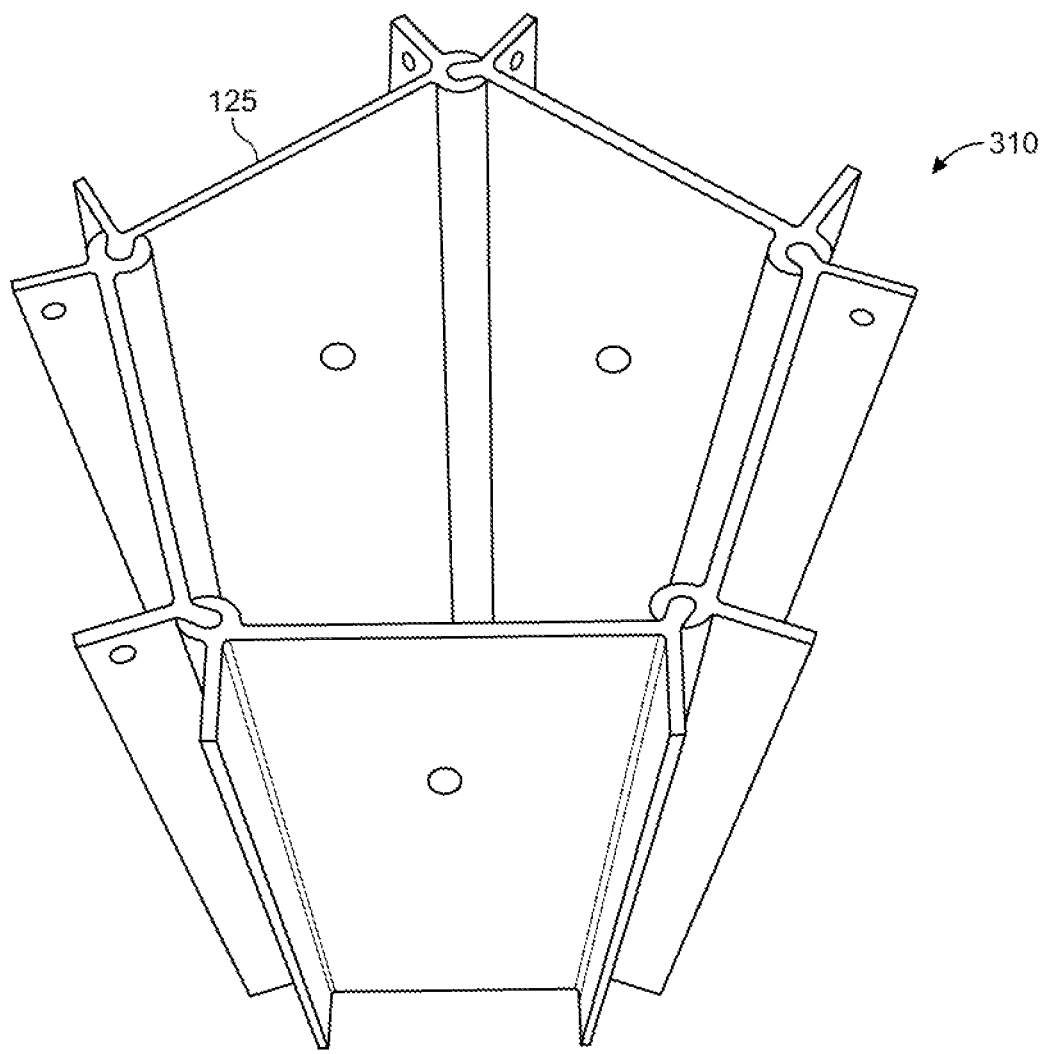
FIG. 3C illustrates a 5-sided embodiment of a center body for a horticultural luminaire.

FIGS. 3A-C illustrate designs for a center body of a horticultural luminaire according to one or more embodiments. As discussed above, various sheets 125 of material may be combined to form different designs or shapes, such as different shapes onto which different numbers of arms 130 may be coupled.

FIG. 3A illustrates a 3-sided embodiment 300 of a center body for a horticultural luminaire according to an embodiment. As shown, 3-sided embodiment 300 of the center body may be formed of three sheets 125 which may be locked into place via male portions 150 and female portions 155, such as discussed above with respect to FIGS. 2A-B. Three arms 130, such as those shown in FIG. 1, may be coupled to 3-sided embodiment 300, with one arm 130 coupled to each sheet 125, for example.

FIG. 3B illustrates a 4-sided embodiment 305 of a center body for a horticultural luminaire according to an embodiment. As shown, 4-sided embodiment 305 of the center body may be formed of four sheets 125 of material which may be locked into place via male portions 150 and female portions 155, such as discussed above with respect to FIGS. 2A-B. Four arms 130 may be coupled to 4-sided embodiment 305, with one arm 130 coupled to each sheet 125, for example.

FIG. 3C illustrates a 5-sided embodiment 310 of a center body for a horticultural luminaire according to an embodiment. As shown, 5-sided embodiment 310 of the center body may be formed of five sheets 125 of material which may be locked into place via male portions 150 and female portions 155, such as discussed above with respect to FIGS. 2A-B. Five arms 130 may be coupled to 5-sided embodiment 310, with one arm 130 coupled to each sheet 125, for example.

A horticultural luminaire in accordance with an embodiment may be considered to have a modular design, such as where each arm is considered to comprise a module, for example. For example, modules may comprise standardized parts or independent units that can be used to construct a more complex structure. Such a modular design may result in efficiencies in terms of shipping and/or installation, for example. For example, a greenhouse operator may purchase sheets 125 and arms 130 in bulk. For example, if a driver 135 mounted on a sheet 125 becomes damaged or otherwise inoperable, a user may detach an arm 130 coupled to the sheet, may remove the sheet 125 with the faulty driver 135, and may insert a new or different sheet 125 with its own driver 135, for example, and may re-attach the arm 130 to the new sheet 125.

Another advantage of a modular design is that a user may selectively determine whether a particular horticultural luminaire should have 3, 4, or 5 arms 130, for example. Instead of installing and using horticultural luminaires which each have the same number of arms 130 and look identical, a user may instead install various horticultural luminaires which may have different numbers of arms. For example, some applications may require more light be provided, in which case a horticultural luminaire with 5 arms 130 may be constructed. If, on the other hand, an application does not require as much light, 3 arms may be attached to a different horticultural luminaire. Moreover, although embodiments discussed above utilize arms which are the same length as each other and which are approximately the same length as the center body 115, it should be appreciated that in some implementations, arms of different lengths may be utilized on a horticultural luminaire. Moreover, shorter arms may be utilized in some implementations.

Figure 4:
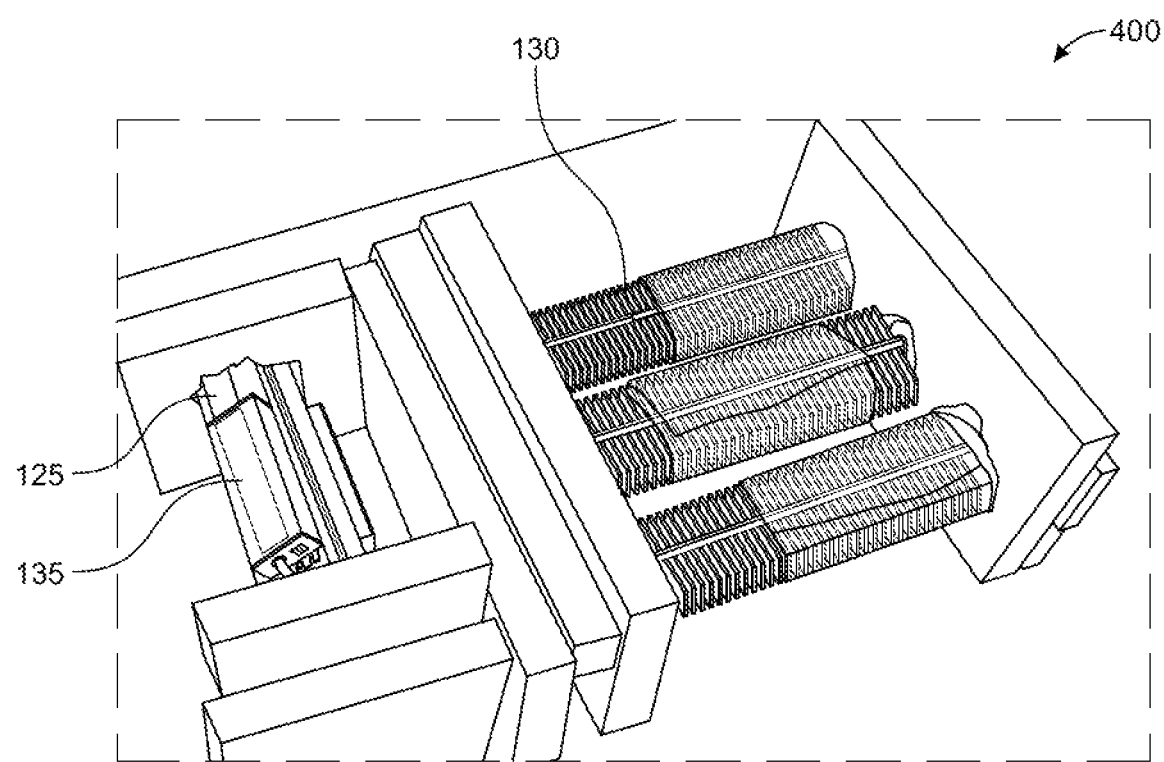
FIG. 4 illustrates packaging for a horticultural luminaire according to an embodiment.

FIG. 4 illustrates packaging for a horticultural luminaire according to an embodiment 400. As illustrated, three arms 130 may be packaged within Styrofoam™ or some other shipping material so as to prevent or limit damage during shipment. A sheet 125 with a driver 135 mounted or coupled thereto may also be shipped within the shipping material. A front cover 120 and a back cover 110 (not shown) may similarly be shipped in the same package. Once a purchaser receives a package of components for a horticultural luminaire, such as is shown in embodiment 400, the purchaser may manually construct or assemble the horticultural luminaire, for example.

Figure 5:
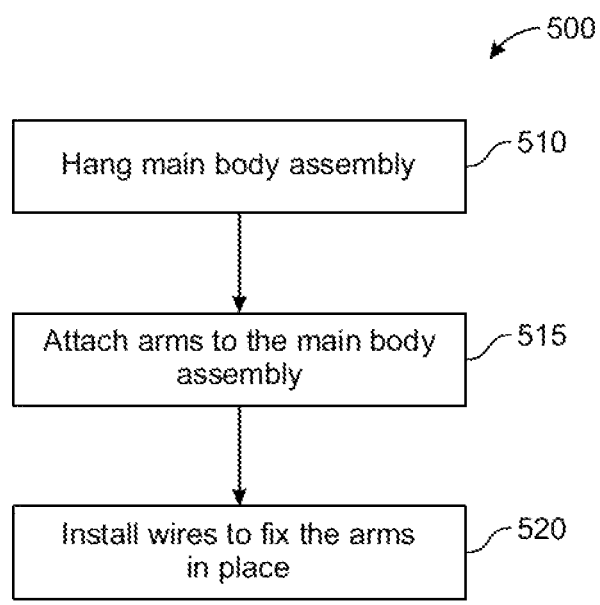
FIG. 5 is an embodiment of a flowchart of a process for assembling a horticultural luminaire.
Figure 6A:
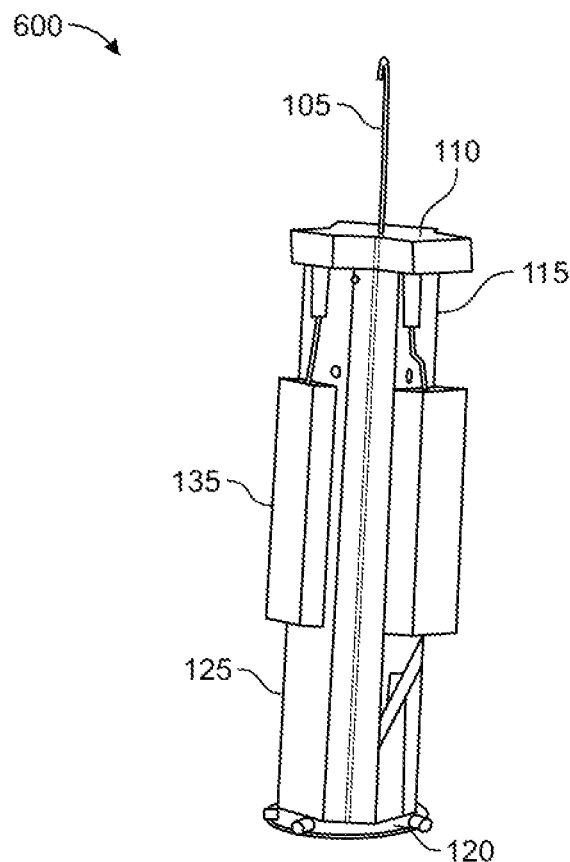
FIGS. 6A-C illustrate an assembly of components of a horticultural luminaire at various stages corresponding to operations of the embodiment of the flowchart shown in FIG. 5.
Figure 6B:
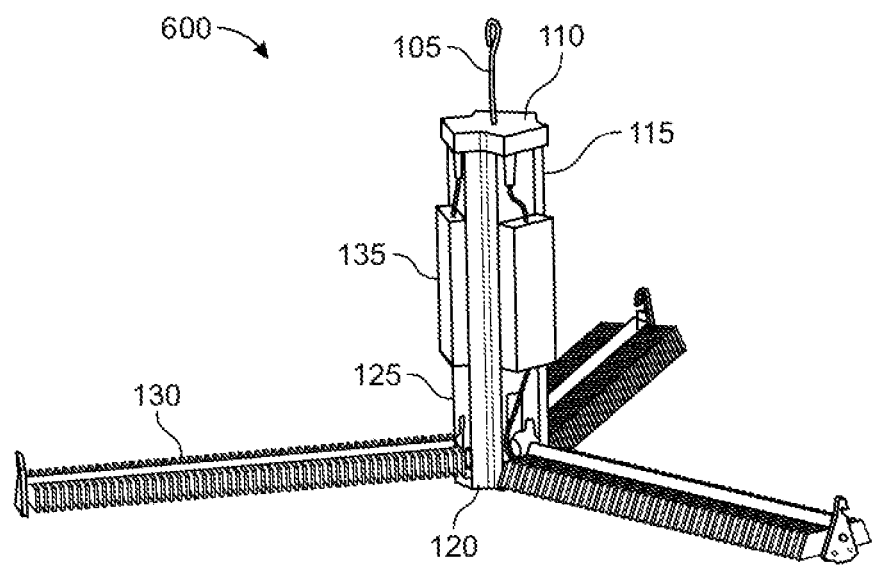
Figure 6C:
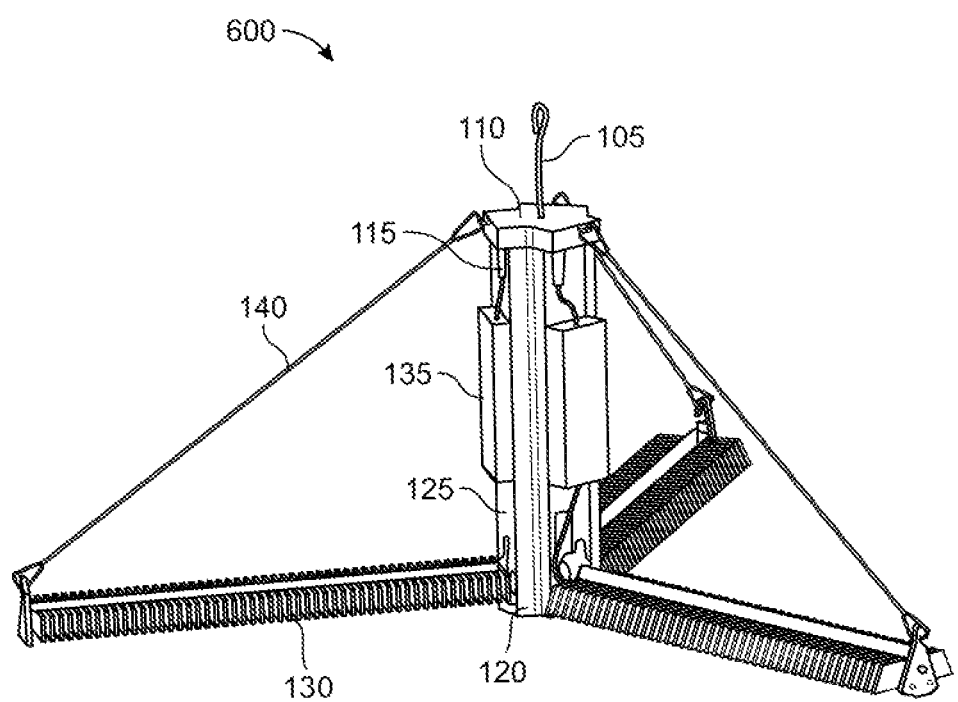

FIG. 5 is an embodiment 500 of a flowchart of a process for assembling a horticultural luminaire. FIGS. 6A-C illustrate an assembly of components of a horticultural luminaire at various stages corresponding to operations in the embodiment 500 of the flowchart. Embodiments in accordance with claimed subject matter may include all of, less than, or more than blocks 505 through 515 of FIG. 5. Also, the order of blocks 505 through 515 is merely an example order.

At operation 505, a main body assembly may be hanged. FIG. 6A illustrates a main body assembly 600 being hanged according to an embodiment. As shown, main body assembly 600 may include pothook 105 which may be utilized to couple the horticultural luminaire to a ceiling or support beam, for example. Pothook 105 may be attached to a back cover 110. A center body 115 or extrusion body may extend in a direction parallel to the pothook 105, for example. Back cover 110 may be coupled to a top end of center body 115 and a front cover 120 may be coupled to a bottom end of center body 115. Center body 115 may be formed of various sheets 125 of material. For example, center body 115 may include several sides extending along a vertical length, where a sheet 125 of material, such as an extrusion part, forms a side. In accordance with an embodiment, three or more sheets 125 of material may form sides forming center body 115. Sheets 125 forming center body 115 may be held in place by back cover 110 and bottom cover 120. A driver 135 to supply electric power may be mounted on a corresponding sheet 125. Main body assembly 600 may have an approximate top and an approximate bottom. Although the main body assembly 600 shown in FIG. 6 has three sides, it should be appreciated that the main body assembly 600 may have a user-configurable number of sides. For example, each side may comprise at least one item of material extending in a planar direction between the approximate top and the approximate bottom of the main body assembly 600.

Referring back to FIG. 5, at operation 510 arms 130 may be attached to main body assembly 600, such as is shown in FIG. 6B. For example, lighting units may be mounted on the arms 130 of the main body assembly 600. An arm 130 may be attached to each side of the main body assembly 600. For example, a first end of each one of the arms 130 may be detachably coupled to a corresponding side of the user-configurable number of sides of the main body assembly 600. A corresponding driver may be mounted on or otherwise attached to one or more sides of the main body assembly so as to provide electrical power to light the lighting units on each of the arms 130.

For example, in accordance with a particular embodiment, arms 130 may be installed without the use of screws, for example, such as via use of a spring and ball snapping or locking mechanism, as discussed below with respect to FIG. 7.

At operation 510, wires 140 may be installed to fix arms 130 in place, such as is shown in FIG. 6C. After the wires have been installed, power may be provided to the drivers 135 so that LEDs may be illuminated or otherwise lit up, for example.

Figure 7:
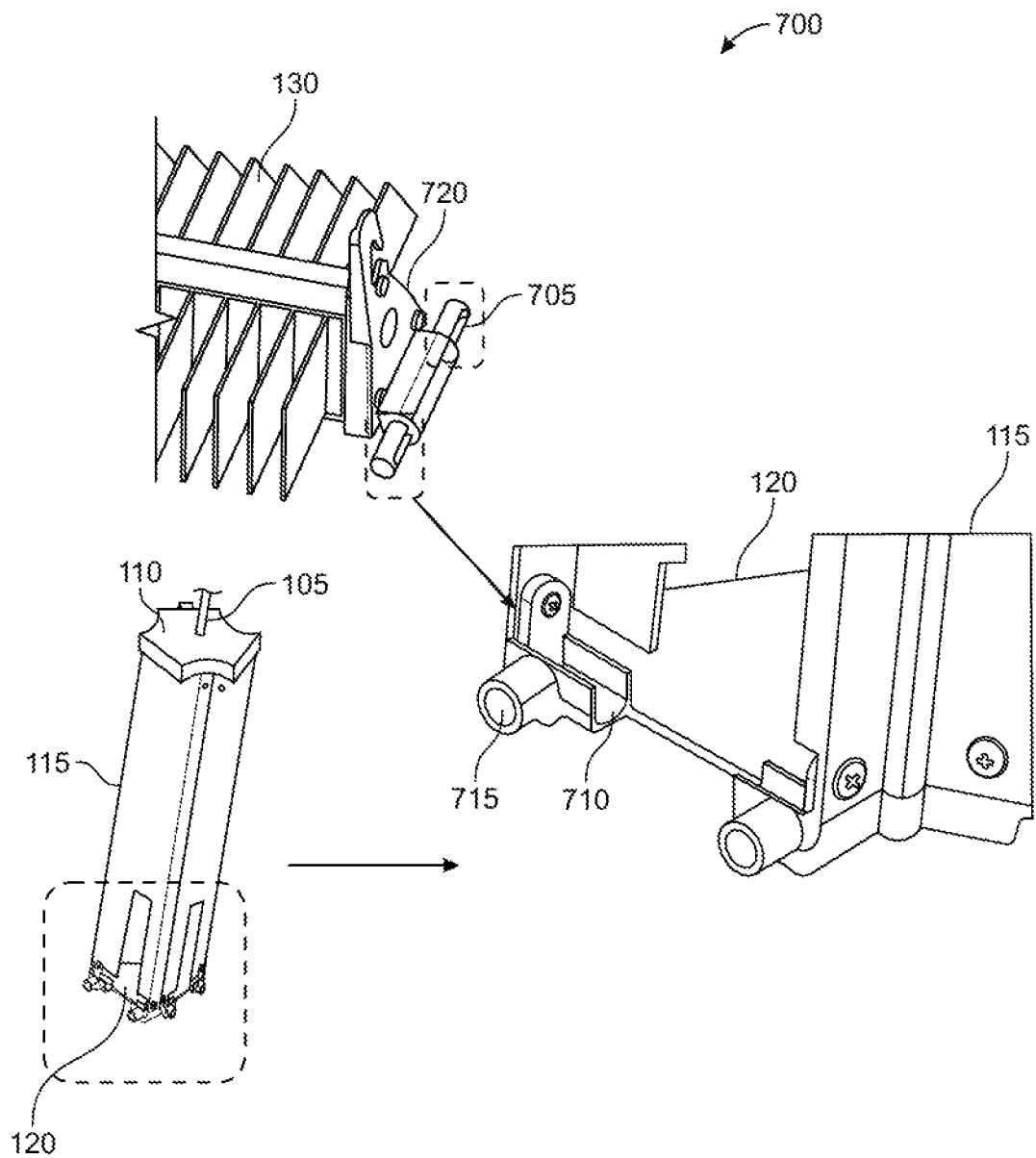
FIG. 7 illustrates an embodiment of one or more mechanisms for securing an arm to a center body of a horticultural luminaire.

FIG. 7 illustrates an embodiment 700 of one or more mechanisms for securing an arm 130 to a center body 115 of a horticultural luminaire. As illustrated, an arm 130 may include a member 705 which may extend in a direction perpendicular to an axis extending a length of the arm 130, for example. Member 705 may be inserted into a receiving portion 710 of center body 115, for example. Although receiving portion 710 is illustrated as being located on center body 115, it should be appreciated that in some implementations, receiving portion 710 may be located on front cover 120, for example. In other implementations, receiving portion 710 may be located on both the center body 115 and the front cover 120, for example. Receiving portion 710 may comprise an approximately u-shaped design and may be capable of receiving member 705 of arm 130. For example, member 705 of arm 130 may be inserted into receiving portion 710 to secure arm 130 to center body 115. Receiving portion 710 may include a spring and ball portion 715, for example, which may lay flush against an end portion 720 of arm 130 when member 705 is positioned within receiving portion 710.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A horticultural luminaire, comprising:
    a center body having a top surface and a bottom surface and at least a first sidewall and a second sidewall coupled to each other, the first and second sidewalls extending along a length of the center body between the top surface and the bottom surface;
    a plurality of drivers comprising a first driver, and a second driver coupled to an external surface of a respective one of the first sidewall and the second sidewall; and
    a plurality of arms comprising a first arm and a second arm onto which a first lighting unit and a second lighting unit, respectively, are mounted, wherein:
        each of the first arm and the second arm comprises a first end detachably coupled to one of the first sidewall and the second sidewall, respectively; and
        each of the first driver and the second driver is adapted to provide electrical power to each of the first lighting unit and the second lighting unit, respectively.

2. The horticultural luminaire of claim 1, wherein the center body has a substantially hollow center portion.

3. The horticultural luminaire of claim 1, wherein each of the first and second lighting units comprise light emitting diodes (LEDs).

4. The horticultural luminaire of claim 1, further comprising a wire to couple a second end, opposite the first end, of each of the first arm and the second arm to the top surface of the center body.

5. The horticultural luminaire of claim 4, wherein the wire comprises steel.

6. The horticultural luminaire of claim 1, further comprising a third sidewall coupled to one of the first sidewall or the second sidewall and a third driver, wherein the third driver is mounted on an external surface of the third sidewall.

7. The horticultural luminaire of claim 1, wherein each of the first arm and the second arm is adapted to rotate relative to the center body.

8. The horticultural luminaire of claim 7, wherein each of the first arm and the second arm is coupled via a hinge to the first sidewall and the second sidewall, respectively, such that the first and second arms are adapted to rotate relative to the center body.

9. The horticultural luminaire of claim 1, wherein each of the first sidewall and the second sidewall comprises a male portion and a female portion, wherein the male portion of the first sidewall is received within the female portion of the second sidewall to couple the first and second sidewalls.

10. The horticultural luminaire of claim 8, wherein the male portion and the female portion are provided at opposing lateral sides of each of the first and second sidewalls.

11. A method of assembling a horticultural luminaire, the method comprising:
    providing a main body assembly comprising a top surface, a bottom surface opposite the top surface, and a plurality of sidewalls adapted to couple to each other and extend along a length of the main body assembly between the top surface and a bottom surface;
    providing a plurality of arms, wherein each of the plurality of arms comprises a first end and a second end opposite the first end and wherein each of the plurality of arms supports a lighting unit;
    coupling the first end of each of the plurality of arms to a respective one of the plurality of sidewalls; and
    electrically coupling a driver located on an external surface of each of the plurality of sidewalls to the lighting unit on one of the plurality of arms.

12. The method of claim 11, further comprising installing a wire to extend between the second end of each arm and the main body assembly.

13. The method of claim 11, further comprising hanging the main body assembly by coupling a hook on the main body assembly to a structure.

14. The method of claim 11, wherein the plurality of sidewalls comprises two or more sidewalls.

15. The method of claim 11, further comprising adjusting a position of one of the plurality of arms relative to the main body assembly.

16. The method of claim 15, wherein adjusting the position of one of the plurality of arms relative to the main body assembly comprises rotating the one of the plurality of arms between a first position with the second end more proximate the main body assembly and an extended second position with the second end more distal the main body assembly.

17. The method of claim 16, further comprising retaining the one of the plurality of arms in the second position with a wire.

18. The method of claim 11, wherein coupling the first end of each of the plurality of arms to the respective one of the plurality of sidewalls comprises rotatably coupling the first end of each of the plurality of arms to the respective one of the plurality of sidewalls.

19. The method of claim 11, wherein the plurality of sidewalls comprises a first sidewall and a second sidewall that are adapted to couple to each other by detachably connecting a male portion of the first sidewall to a female portion of the second sidewall.

20. The method of claim 19, wherein the detachably connecting comprises sliding the male portion of the first sidewall into the female portion of the second sidewall.

\* \* \* \* \*